US012056184B2

(12) United States Patent
Cheng

(10) Patent No.: US 12,056,184 B2
(45) Date of Patent: Aug. 6, 2024

(54) METHOD AND APPARATUS FOR GENERATING DESCRIPTION INFORMATION OF AN IMAGE, ELECTRONIC DEVICE, AND COMPUTER READABLE STORAGE MEDIUM

(71) Applicant: Baidu Online Network Technology (Beijing) Co., Ltd., Beijing (CN)

(72) Inventor: Zhou Cheng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 660 days.

(21) Appl. No.: 17/180,307

(22) Filed: Feb. 19, 2021

(65) Prior Publication Data

US 2021/0311985 A1    Oct. 7, 2021

(30) Foreign Application Priority Data

Apr. 3, 2020    (CN) .......................... 202010260503.8

(51) Int. Cl.
*G06F 16/535*    (2019.01)
*G06F 16/58*    (2019.01)
(Continued)

(52) U.S. Cl.
CPC ........ *G06F 16/5866* (2019.01); *G06F 16/535* (2019.01); *G06F 16/5846* (2019.01); *G06F 40/295* (2020.01)

(58) Field of Classification Search
CPC ...... G06F 16/58; G06F 16/587; G06F 16/583; G06F 16/5866; G06F 16/5846;
(Continued)

(56) References Cited

U.S. PATENT DOCUMENTS 9,489,401 B1    11/2016  Garcia
2003/0195883 A1*  10/2003  Mojsilovic ............ G06V 10/40
(Continued)

FOREIGN PATENT DOCUMENTS

CN    108229578 A    6/2018
CN    108921894 A    11/2018
(Continued)

OTHER PUBLICATIONS

Shun Hattori et al.; "Extracting Visual Descriptions of Geographic Features from the Web as the Linguistic Alternatives to Their Images in Digital Documents"; vol. 48, No. SIG 11(TOD 34), pp. 69-82; Jun. 2007 (17 pages).
(Continued)

*Primary Examiner* — Sumati Lefkowitz
*Assistant Examiner* — Michael Adam Shariff
(74) *Attorney, Agent, or Firm* — Ice Miller LLP; Justin D. Swindells

(57) ABSTRACT

A method and apparatus for image processing, an electronic device, and a computer readable storage medium are provided. The method may include acquiring description information of a reference image matching a target image from a reference image information database. The method further includes determining at least one entity from the description information of the reference image, the at least one entity identifying an object associated with the reference image. In addition, the method may further include generating description information of the target image based on the at least one entity.

16 Claims, 5 Drawing Sheets

(51) Int. Cl.
*G06F 16/583* (2019.01)
*G06F 40/295* (2020.01)

(58) Field of Classification Search
CPC ...... G06F 40/295; G06F 16/532; G06F 16/50;
G06F 16/00; G06F 40/30; G06F 16/53;
G06F 18/2155; G06F 18/214; G06F
40/205; G06F 40/211; G06F 16/535;
G06F 40/289; G06F 40/279; G06F
17/30861; G06F 17/30864; G06T 11/60;
G06T 2207/20081; G06T 2207/20084;
G06T 7/33; G06T 7/337; G06T 7/70;
G06T 7/73; G06T 7/35; G06T 7/77;
G06T 7/74; G06V 10/70; G06V 10/764;
G06V 10/82; G06V 10/40; G06V 10/44;
G06V 10/443; G06V 10/454; G06V
10/74; G06V 20/70
See application file for complete search history.

(56) References Cited

U.S. PATENT DOCUMENTS

| | | | |
|---|---|---|---|
| 2010/0077003 A1 | 3/2010 | Satoshi et al. | |
| 2015/0154232 A1* | 6/2015 | Ovsjanikov | G06F 16/5838 707/780 |
| 2017/0200065 A1 | 7/2017 | Wang et al. | |
| 2019/0294705 A1 | 9/2019 | Kumar et al. | |
| 2020/0004815 A1* | 1/2020 | Weisberg | G06N 5/046 |
| 2020/0257659 A1 | 8/2020 | Zhang et al. | |

FOREIGN PATENT DOCUMENTS

| | | |
|---|---|---|
| CN | 109933647 A | 6/2019 |
| JP | 2004287670 A | 10/2004 |
| JP | 2016167236 A | 9/2016 |
| WO | 2008152805 A1 | 12/2008 |

OTHER PUBLICATIONS

K. Kesorn et al.; "Semantic Representation of Text Captions to Aid Sport Image Retrieval"; 2008 International Symposium on Intelligent Signal Processing and Communication Systems (ISPACS 2008); Bangkok, Thailand; DOI: 10.1109/ISPACS.2009.4806708 (7 pages).

Extended European Search Report for Application No. 21159653.1, dated Jul. 19, 2021 (8 pages).

Sanqiang Zhao et al.; "Informative Image Captioning with External Sources of Information"; Arxiv.org, Cornell University Library, 201 Olin Library, Ithaca, New York; Jun. 20, 2019; XP081378755 (10 pages).

Sharma, P. et al.; "Conceptual Captions: A Cleaned, Hypernymed, Image Alt-text Dataset for Automatic Image Captioning"; Proceedings of the 56 Annual Meeting of the Association for Computational Linguistics (vol. 1, Long Papers), vol. 1, Stroudsburg, Pennsylvania; Jul. 20, 2018, pp. 2556-2565; XP055738106 (10 pages).

* cited by examiner

METHOD AND APPARATUS FOR GENERATING DESCRIPTION INFORMATION OF AN IMAGE, ELECTRONIC DEVICE, AND COMPUTER READABLE STORAGE MEDIUM

CROSS-REFERENCE TO RELATED APPLICATIONS

This application claims priority to Chinese Application No. 202010260503.8, filed on Apr. 3, 2020 and entitled "Method and Apparatus for Image Processing, Electronic Device, and Computer Readable Storage Medium," the content of which is hereby incorporated by reference in its entirety.

TECHNICAL FIELD

Embodiments of the present disclosure mainly relate to the field of artificial intelligence, and more specifically to a method and apparatus for image processing, an electronic device, and a computer readable storage medium.

BACKGROUND

Regarding an image observed through web browsing or a thing seen in life, a user may have a need for search using the image to further understand information of the observed image or description information (e.g., a name) of the thing. Specifically, when the user discovers a national flag of an unknown country, a building of an unknown name, paintings, a famous person, or the like, description information of the image needs to be determined based on a known image, and the description information needs to be used as an answer to be fed back to the user. An existing approach of determining description information of an image generally fails to respond to rapid development and change of the image and/or an information source (e.g., Internet knowledge update changing in real time), and is limited to a fixed or specific knowledge set, such that the description information of the image is not specific enough.

SUMMARY

According to example embodiments of the present disclosure, a solution for image processing is provided.

In a first aspect, an embodiment of the present disclosure provides a method for image processing. The method may include acquiring description information of a reference image matching a target image from a reference image information database. The method further includes determining at least one entity from the description information of the reference image, the at least one entity identifying an object associated with the reference image. And the method may further include generating description information of the target image based on the at least one entity.

In a second aspect, an embodiment of the present disclosure provides an apparatus for image processing, the apparatus including: a reference image description information acquiring module configured to acquire description information of a reference image matching a target image from a reference image information database; an entity determining module configured to determine at least one entity from the description information of the reference image, the at least one entity identifying an object associated with the reference image; and a target image description information generating module configured to generate description information of the target image based on the at least one entity.

In a third aspect, an embodiment of the present disclosure provides an electronic device, the electronic device including: one or more processors; and a storage apparatus for storing one or more programs, the one or more programs, when executed by the one or more processors, cause the one or more processors to implement the method according to the first aspect.

In a fourth aspect, an embodiment of the present disclosure provides a computer readable storage medium, storing a computer program thereon, where the program, when executed by a processor, implements the method according to the first aspect.

It should be appreciated that the description of the Summary is not intended to limit the key or important features of embodiments of the present disclosure, or to limit the scope of embodiments of the present disclosure. Other features of embodiments of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference numerals in the drawings denote the same or similar elements.

DETAILED DESCRIPTION OF EMBODIMENTS

Figure 1:
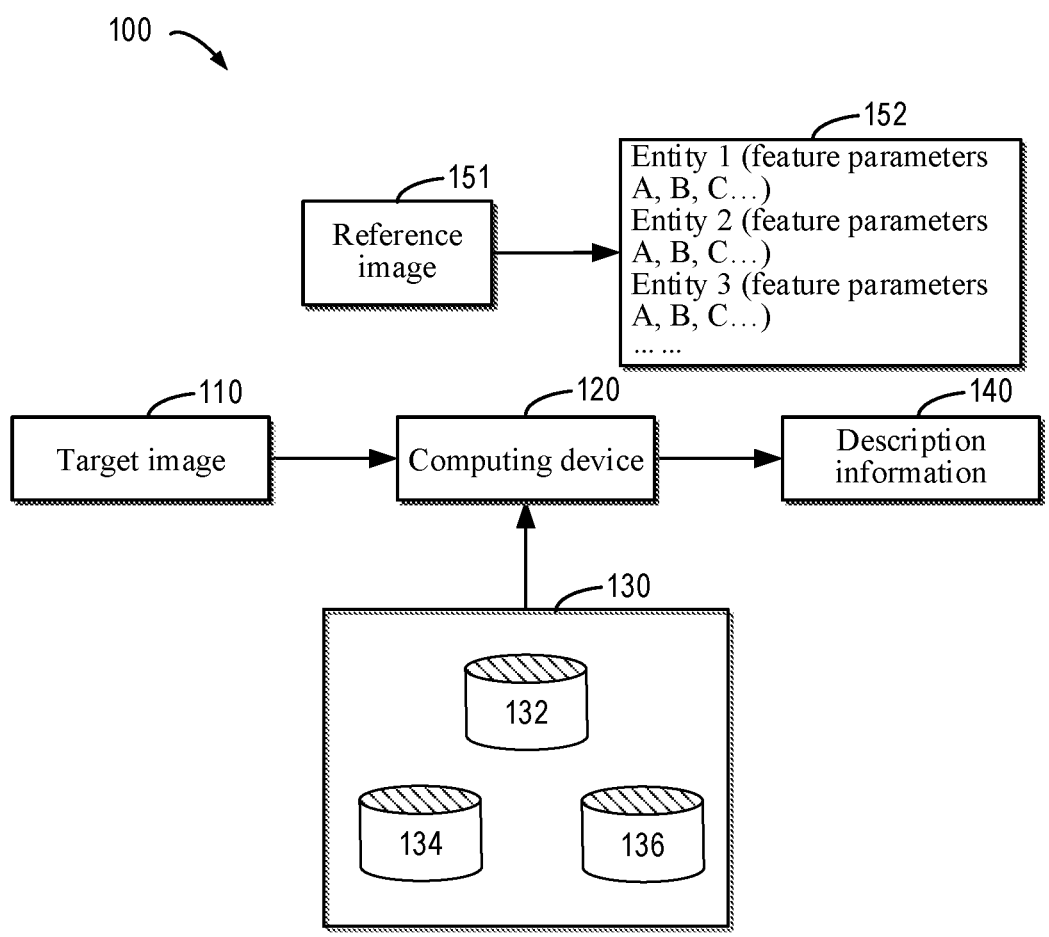
FIG. 1 shows a schematic diagram of an example environment in which a plurality of embodiments of the present disclosure may be implemented.

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of embodiments of the present disclosure, the term "include" and the like should be interpreted as open inclusion, i.e., "include but not limited to". The term "based on" should be interpreted as "at least partially based on". The term. "one embodiment" or "the embodiment" should be interpreted as "at least one embodiment". The terms "first", "second" and the like may indicate different or identical objects. Other explicit and implicit definitions may also be included below.

In a process of determining, based on an image, description information of the image, generally by training a classification model, description information of an image to be searched by a user may be determined using the trained classification model. However, since knowledge update of the Internet changes and develops in real time, it is necessary to constantly train the classification model based on new knowledge, which generally requires high human resource costs.

In addition, lexicons and corresponding images thereof may also be collected by simple search. When one of the images matches a desired image to be searched by the user, the lexicon corresponding to the image is selected as an answer and fed back to the user. However, this approach still fails to respond to real-time update of Internet knowledge, unless high human resource costs are paid. In addition, the lexicon generally only involves relatively general entity nouns, such that the determined description information may not be specific enough.

According to an embodiment of the present disclosure, an improved solution for image processing is presented. In this solution, a relevant entity is extracted using text information of a webpage including a reference image matching a user-inputted target image to describe the target image. Specifically, a reference image information database constructed based on an image source and/or an information source may be first acquired. The reference image information database at least includes a reference image and description information of the reference image. The target image is compared with the reference image in the reference image information database, to find the reference image matching the target image, and then further determine the description information of reference image. Then, at least one entity may be acquired from the determined description information, and description information of the target image may be determined based on the at least one entity. In this way, accurate description information can be provided fully based on constantly updated images and information sources, thereby effectively saving the human resource costs, and significantly improving the user experience.

FIG. 1 shows a schematic diagram of an example environment 100 in which a plurality of embodiments of the present disclosure may be implemented. In this example environment 100, a target image 110 may be a user-inputted to-be-searched image, e.g., an image obtained by a user through copying or screenshotting an image on a network, or a photo of an object taken by a user. As another example, the target image 110 may also be a network image automatically acquired by an image processing system or an image in an external storage device for subsequent generation of description information. The above examples are merely used for describing embodiments of the present disclosure, rather than specifically limiting embodiments of the present disclosure.

As shown in FIG. 1, in order to determine the description information of the target image 110, the target image 110 is inputted into a computing device 120. In some embodiments, the computing device 120 may include, but is not limited to, a personal computer, a server computer, a hand-held or laptop device, a mobile device (e.g., a mobile phone, a personal digital assistant (PDA), and a media player), a multi-processor system, consumer electronics, a minicomputer, a mainframe computer, a distributed computing environment including any one of the above systems or devices, or the like.

In some embodiments, the computing device 120 may be in cloud, and is configured to acquire description information of a reference image matching the target image 110 from a reference image information database 130 communicatively connected to the computing device, and to determine description information 140 of the target image 110 based on the description information of the reference image. The reference image information database 130 includes a plurality of reference images and corresponding description information thereof. As shown in FIG. 1, as an example, the reference image information database 130 includes a plurality of information groups 132, 134, and 136, and each information group stores a reference image and corresponding description information thereof. The description information of the reference image may include at least one of: text information or structured information of the reference image.

As an example, as shown in FIG. 1, when finding a reference image 151 matching the target image 110 from the plurality of information groups 132, 134, and 136, the computing device 120 may acquire description information of the reference image 151 from a corresponding information group, and extract a plurality of entities, e.g., an entity 1, an entity 2, and an entity 3, from the description information. In addition, the computing device 120 further statisticizes, from these entities, a plurality of feature parameters of each of these entities, e.g., a feature parameter A, a feature parameter B, and a feature parameter C.

After processing by the computing device 120, the description information 140 of the target image 110 may be determined based on the above entities and feature parameters, and fed back to the user as a processing result. As an example, the description information 140 may be used for describing a specific name of an object involved in the target image 110, thereby meeting the user needs for knowing about relevant knowledge information of the target image 110.

It should be understood that the environment shown in FIG. 1 is merely an example, rather than a specific limit of the present disclosure.

Figure 2:
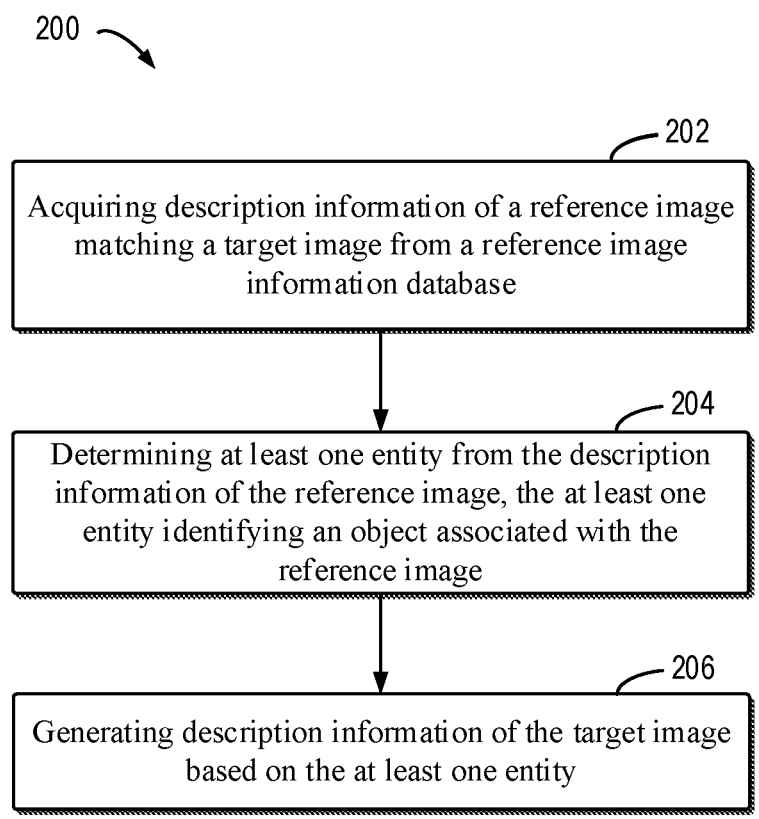
FIG. 2 shows a flowchart of a process for image processing according to an embodiment of the present disclosure.

FIG. 2 shows a flowchart of a process 200 for image processing according to an embodiment of the present disclosure. In some embodiments, the method 200 may be implemented in a device shown in FIG. 6. The process 200 for processing the target image 110 according to an embodiment of the present disclosure will be described with reference to FIG. 1. For ease of understanding, all specific data mentioned in the following description is an example, and is not used for limiting the protection scope of the present disclosure.

At 202, the computing device 120 may acquire description information of a reference image matching the target image 110 from the reference image information database 130. As an example, as shown in FIG. 1, if it is determined that a reference image in the information group 134 matches the target image 110, then corresponding description information may be acquired from the information group 134. According to an embodiment of the present disclosure, the description information of the reference image may include at least one of: text information or structured information of the reference image. Thus, the reference image may be associated with all relevant text information to provide conditions for a subsequent process of extracting an entity word. As an example, a knowledge acquiring technology, e.g., web crawler, may be used to crawl all contents on the Internet, and extract an image on a webpage, text information around the image, and structured information of the webpage, e.g., a text content of a <title> tag, and a visible title of a specific website. The text information around the image and the structured information of the webpage constitute the description information of the reference image. The above information is correspondingly stored in the reference image information database 130, and is updated in real time or regularly based on the knowledge acquiring technology, e.g., web crawler. An image of the reference image information database 130 is referred to as a reference image, and a webpage including the image is referred to as an image source (or referred to as a "source file").

In some embodiments, after receiving the target image 110, the computing device 120 may extract a feature vector of the target image 110, and compare the extracted feature vector with a feature vector of each image in the reference image information database 130. When an image with a matching degree greater than a preset threshold is found in the reference image information database 130, the image is determined as the reference image, and the description information corresponding to the reference image is acquired. It should be understood that the above approach of determining the reference image is merely an example, rather than a specific limit of the present disclosure. For example, not only the description information of the reference image, but also an image source including the image can be acquired. In this way, the reference image matching the target image 110 and the description information of the reference image can be quickly determined, thereby providing conditions for subsequent processing of the description information of the reference image.

At 204, the computing device 120 may determine at least one entity from the description information of the reference image, the at least one entity identifying an object associated with the reference image. As an example, the at least one entity may be acquired from the description information of the reference image using a named entity recognition (NER) technology. As an example, the description information of the reference image is the text information and the structured information of the reference image. A plurality of entities, e.g., a plurality of entity nouns, may be extracted from such information using the NER technology, to form a candidate entity noun set. In this way, an entity word related to the target image 110 may be acquired as a candidate without manual intervention.

Alternatively, these entity nouns may be extracted and stored using the NER when performing webpage crawling and storage. Alternatively or additionally, these entity nouns may also be extracted using the NER after being determined as entities of the reference image.

Figure 3:
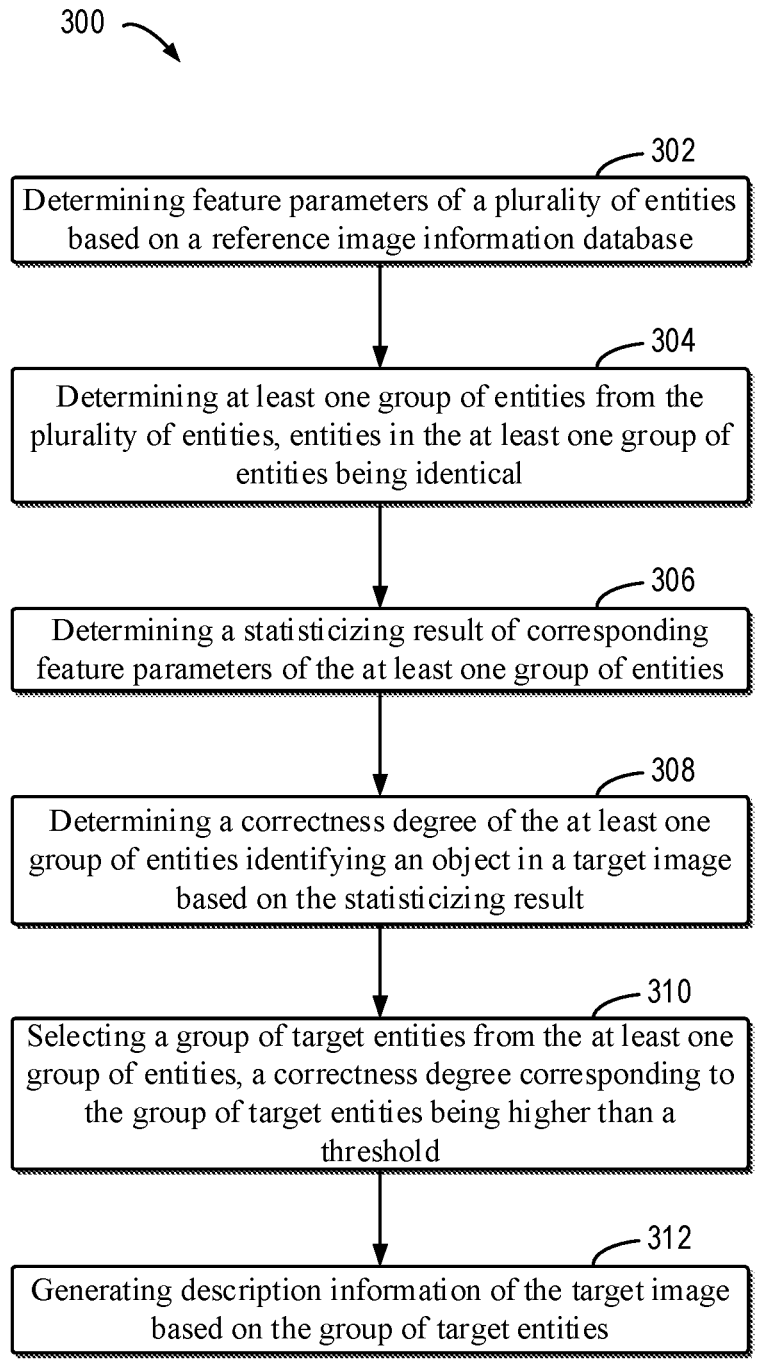
FIG. 3 shows a flowchart of a process for generating description information of a target image according to an embodiment of the present disclosure.

At 206, the computing device 120 may generate the description information 140 of the target image 110 based on the at least one entity. It should be understood that the generated description information 140 is completely different from the above description information of the reference image. The above description information of the reference image includes the text information around the image and the structured information of the webpage, and the description information 140 may only include one or more entity words for simple description of the target image 110. It should also be understood that the computing device 120 may determine the description information 140 of the target image 110 by various approaches. For example, FIG. 3 shows a flowchart of a process 300 for generating the description information 140 of the target image 110 according to an embodiment of the present disclosure. For ease of understanding, all specific processes mentioned in the following description are examples, and are not used for limiting the protection scope of the present disclosure.

At 302, when determining there being a plurality of entities, the computing device 120 may determine feature parameters of these entities based on the reference image information database 130. The feature parameters of these entities may include at least of: the number of times of displaying a content of an image source including these entities, the number of views for the content of the image source, the number of clicks for the content of the image source, the number of occurrences of these entities in the content of the image source, and weights corresponding to positions of these entities in the content of the image source including these entities.

At 304, the computing device 120 may determine at least one group of entities from the plurality of entities, entities in the at least one group of entities being identical. As an example, after determining a plurality of reference images and description information thereof, the plurality of entities may be determined from such description information. Due to a correlation between the reference images, identical entities exist in the determined plurality of entities. Therefore, the identical entities may be determined as a group of entities.

At 306, the computing device 120 may determine a statisticizing result of corresponding feature parameters of the at least one group of entities. As an example, the computing device 120 may determine the statisticizing result of the corresponding feature parameters of the group of entities, e.g., statistical information such as a sum, or an average. For example, a sum of the number of times of displaying a content of an image source including the group of entities, a sum of the number of occurrences of these entities in the content of the image source, an average of weights corresponding to positions of these entities in the content of the image source including these entities, or the like may be computed. It should be understood that the above computing approach is only an example, and is not used to limit the present disclosure.

Then, the computing device 120 may generate the description information 140 of the target image 110 based on the statisticizing result. In this way, the work of manual annotation may be merely focused on a process of training a description information generating model, thereby reducing the human resource costs. It should be understood that the description information 140 may be generated by various approaches. As an example, at 308, a correctness degree of the at least one group of entities identifying an object in the target image 110 is determined. It should be understood that the correctness degree may be used for indicating a matching degree between the at least one group of entities and the object in the target image 110, or indicating a probability of the at least one group of entities correctly identifying the object in the target image 110. As an example, this process can be achieved by training a scoring model. For example, whether each entity is related to the object in the target image 110 is scored using a gradient boosted decision tree (GBDT) algorithm based on feature training. The higher the score is, the more the entity matches with the object in the target image 110, or the higher the probability of the entity correctly identifies the object in the target image 110 is.

Then, at 310, the computing device 120 may select a group of target entities from the at least one group of entities, the correctness degree corresponding to the group of target entities being higher than a threshold. As an example, a higher-scoring or highest-scoring entity may be selected based on a score of each entity. If a score of a highest-scoring entity word is lower than a preset score threshold, then it is determined that there is no proper entity in this search, otherwise the higher-scoring or highest-scoring entity is outputted. Then, at 312, the computing device 120 may generate the description information 140 of the target image 110 based on the group of target entities.

By the above approach, an entity word most relevant to the target image 110 can be determined from description information associated with a plurality of reference images based on the trained scoring model, thereby providing a user with most accurate description information 140 of the target image 110. In addition, the work of manual annotation is merely focused on a process of training the scoring model, thereby reducing the human resource costs.

Figure 4:
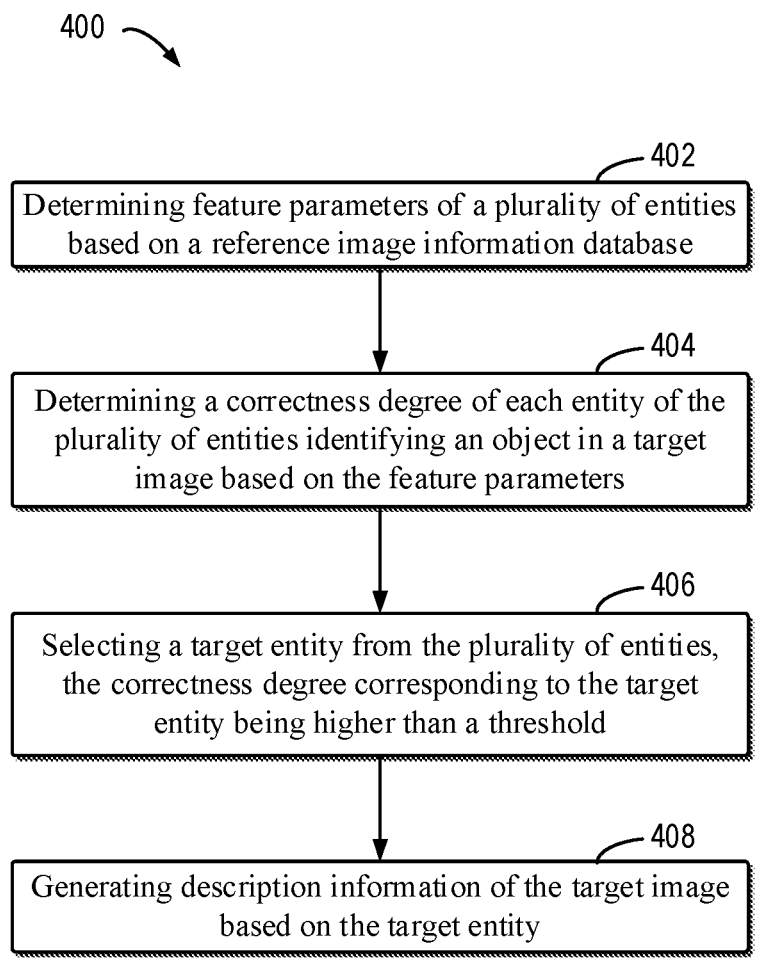
FIG. 4 shows a flowchart of another process for generating the description information of the target image according to an embodiment of the present disclosure.

In addition, the computing device 120 may also determine the description information 140 of the target image 110 by the following approach. FIG. 4 shows a flowchart of another process 400 for generating the description information 140 of the target image 110 according to an embodiment of the present disclosure. For ease of understanding, all specific processes mentioned in the following description are examples, and are not used for limiting the protection scope of the present disclosure.

At 402, when determining there being a plurality of entities, the computing device 120 may determine feature parameters of these entities based on the reference image information database 130. The feature parameters of these entities may include at least one parameter of: the number of times of displaying a content of an image source including these entities, the number of views for the content of the image source, the number of clicks for the content of the image source, the number of occurrences of these entities in the content of the image source, or weights corresponding to positions of these entities in the content of the image source including these entities.

At 404, the computing device 120 may determine a correctness degree of each entity of these entities identifying an object in the target image 110 based on the feature parameters. As an example, this process can be achieved by training a deep learning model. For example, a probability of each entity correctly identifying the object in the target image 110 can be predicted based on feature parameters of each entity using a long short-term memory (LSTM) network or a sequence model such as a Transformer model.

At 406, the computing device 120 may select a target entity from the plurality of entities, the correctness degree corresponding to the target entity being higher than a threshold. As an example, an entity with a higher or highest probability of correctly identifying the object in the target image may be selected. If the higher or highest probability of correctly identifying the object in the target image is lower than a preset probability threshold, then it is determined that there is no proper entity in this search, otherwise the entity with the higher or highest probability of correctly identifying the object in the target image is outputted. Then, at 408, the computing device 120 may generate the description information 140 of the target image 110 based on the target entity.

By the above approach, an entity word most relevant to the target image 110 can be determined from description information associated with a plurality of reference images based on a trained learning model, thereby providing a user with most accurate description information 140 of the target image 110. In addition, the work of manual annotation is merely focused on a process of training the learning model, thereby reducing the human resource costs.

Additionally, in some embodiments, the computing device 120 may further update the reference image information database 130. This updating process can be achieved by various approaches. In an embodiment, the computing device 120 may acquire various kinds of supplementary image information, such as a network image, a user-inputted image, and an image in an external storage device, and update the reference image information database 130 based on such supplementary image information. The network image may be, for example, an image that is acquired through the Internet or other networks and is stored on a network device. The user-inputted image may be, for example, an image that is taken by a user through a terminal device such as a mobile phone or a camera and is sent to the computing device 120. The image in the external storage device may be, for example, an image stored in a mobile storage device, a cloud storage device, or the like. Specifically, the reference image information database may be updated regularly or at any time. For example, the reference image information database may be updated based on the network image, the user-inputted image, and the image in the external storage device. In the whole process of determining the description information, the process of creating and updating the reference image information database can be realized automatically and regularly through a knowledge acquiring technology such as web crawler. The process of generating the description information of the target image based on a determined entity can be realized by a manually trained model. In this way, the reference image information database can be updated based on a constantly evolving and rapidly updated Internet knowledge set without unnecessary manual intervention.

In some embodiments, the feature parameters may be determined by the following approach. First, the computing device 120 may determine information related to an image source of the reference image from the reference image information database 130. Then, the computing device 120 may determine the feature parameters of these entities based on the information related to the image source of the reference image. The feature parameters of these entities may include at least one of: the number of times of displaying a content of an image source including these entities, the number of views for the content of the image source, the number of clicks for the content of the image source, the number of occurrences of these entities in the content of the image source, weights corresponding to positions of these entities in the content of the image source including these entities, matching degrees between the entities and the target image, or a matching degree between the content of the image source including the entities and the target image. In this way, a correlation between each entity and the target image 110 can be detected in different dimensions, thereby providing a comprehensive evaluation system for determining accurate description information 140. It should be understood that the above approach of determining the feature parameters is merely an example, and is not used for limiting the scope of the present disclosure.

It should be understood that the advantage of the method for image processing of embodiments of the present disclosure over the existing image recognition method is that whenever new entity information (e.g., a new star, a new building, or a new product) appears on a network, the method for image processing of embodiments of the present disclosure does not require manually retraining an image recognition model as the existing image recognition method.

The reason is that embodiments of the present disclosure update the reference image information database 130 using a knowledge acquiring technology such as web crawler, extract an entity from description information of a reference image using a trained model, and generate the description information 140 of the target image 110 using the trained model based on a statisticizing result of the entity. All models in embodiments of the present disclosure do not need to be retrained whenever new entity information appears. Thus, a constantly updated Internet knowledge set can be fully covered without very much manual intervention, thereby determining accurate description information for a user, saving the human resource costs, and improving the user experience.

Figure 5:
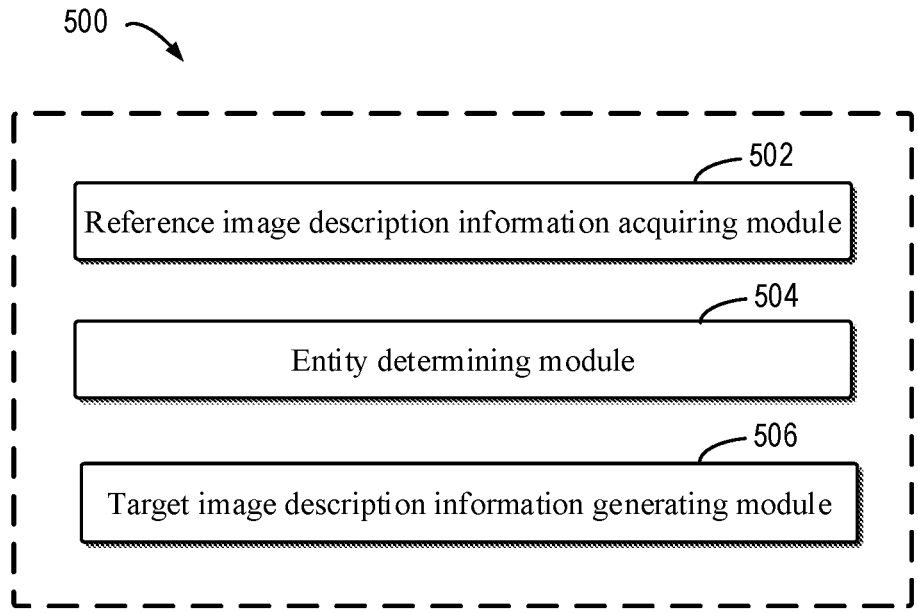
FIG. 5 shows a block diagram of an apparatus for processing a target image according to an embodiment of the present disclosure.

FIG. 5 shows a block diagram of an apparatus 500 for processing a target image 110 according to an embodiment of the present disclosure. As shown in FIG. 5, the apparatus 500 may include: a reference image description information acquiring module 502 configured to acquire description information of a reference image matching the target image from a reference image information database; an entity determining module 504 configured to determine at least one entity from the description information of the reference image, the at least one entity identifying an object associated with the reference image; and a target image description information generating module 506 configured to generate description information of the target image based on the at least one entity.

In some embodiments, the apparatus 500 may include: a supplementary image information acquiring module (not shown) configured to acquire supplementary image information, the supplementary image information including description information of at least one of: a network image, a user-inputted image, or an image in an external storage device; and a reference image information database updating module (not shown) configured to update the reference image information database based on the supplementary image information.

In some embodiments, the entity determining module 504 may include: an entity acquiring module (not shown) configured to acquire the at least one entity from the description information of the reference image using a named entity recognition technology.

In some embodiments, the at least one entity includes a plurality of entities, and the target image description information generating module 506 may include: a feature parameter determining module (not shown) configured to determine feature parameters of the plurality of entities based on the reference image information database; an entity group determining module (not shown) configured to determine at least one group of entities from the plurality of entities, entities in the at least one group of entities being identical; a statisticizing result determining module (not shown) configured to determine a statisticizing result of corresponding feature parameters of the at least one group of entities; a correctness degree determining module (not shown) configured to determine a correctness degree of the at least one group of entities identifying an object in the target image based on the statisticizing result; a target entity group selecting module (not shown) configured to select a group of target entities from the at least one group of entities, the correctness degree corresponding to the group of target entities being higher than a threshold; and a description information generating module (not shown) configured to generate the description information of the target image based on the group of target entities.

In some embodiments, the at least one entity includes a plurality of entities, and the target image description information generating module 506 may include: the feature parameter determining module (not shown) configured to determine feature parameters of the plurality of entities based on the reference image information database; the correctness degree determining module (not shown) configured to determine a correctness degree of each of the plurality of entities identifying an object in the target image based on the feature parameters; a target entity selecting module (not shown) configured to select a target entity from the plurality of entities, the correctness degree corresponding to the target entity being higher than a threshold; and the description information generating module (not shown) configured to generate the description information of the target image based on the target entity.

In some embodiments, the feature parameter determining module includes: an image source related information determining module (not shown) configured to determine information related to an image source of the reference image from the reference image information database; and a feature parameter information determining module (not shown) configured to determine, based on the information related to the image source of the reference image, at least one of: a number of times of displaying a content of the image source including the at least one entity; a number of views for the content of the image source; a number of clicks for the content of the image source; a number of occurrences of the at least one entity in the content of the image source; a weight corresponding to a position of the at least one entity in the content of the image source; a matching degree between the at least one entity and the target image; or a matching degree between the content of the image source including the at least one entity and the target image.

In some embodiments, the description information of the reference image includes at least one of: text information or structured information of the reference image.

Figure 6:
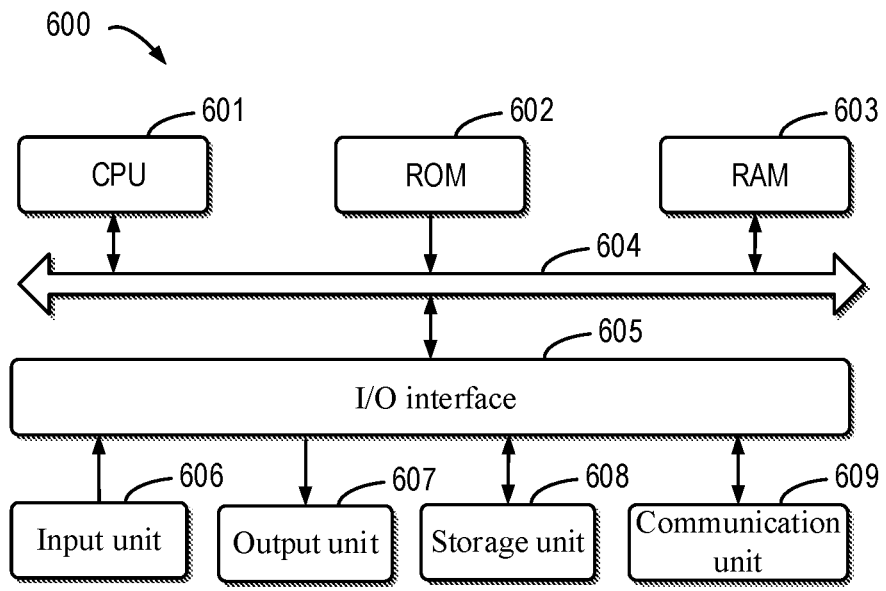
FIG. 6 shows a block diagram of a computing device for implementing a plurality of embodiments of the present disclosure.

FIG. 6 shows a block diagram of a computing device 600 for implementing a plurality of embodiments of the present disclosure. The device 600 may be configured to implement the computing device 120 of FIG. 1. As shown in the figure, the device 600 includes a central processing unit (CPU) 601, which may execute various appropriate actions and processes in accordance with computer program instructions stored in a read-only memory (ROM) 602 or computer program indications loaded into a random-access memory (RAM) 603 from a storage unit 608. The RAM 603 may further store various programs and data required by operations of the device 600. The CPU 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard, and a mouse; an output unit 607, such as various types of displays and speakers; the storage unit 608, such as a magnetic disk, and an optical disk; and a communication unit 609, such as a network card, a modem, and a wireless communication transceiver. The communication unit 609 allows the device 600 to exchange information/data with other devices via a computer network, e.g., the Internet, and/or various telecommunication networks.

The processing unit 601 executes various methods and processes described above, such as the process 200, the process 300, and the process 400. For example, in some embodiments, the process 200, the process 300, and the process 400 may be implemented in a computer software program that is tangibly included in a machine-readable medium, such as the storage unit 608. In some embodiments, a part or all of the computer programs may be loaded and/or installed onto the device 600 via the ROM 602 and/or the communication unit 609. When the computer program is loaded into the RAM 603 and executed by the CPU 601, one or more steps of the process 200, the process 300, and the process 400 described above may be executed. Alternatively, in other embodiments, the CPU 601 may be configured to execute the process 200, the process 300, and the process 400 by any other appropriate approach (e.g., by means of firmware).

The functions described herein above may be performed, at least in part, by one or more hardware logic components. For example, and without limitation, example types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for image processing, comprising:
    acquiring description information of a reference image matching a target image from a reference image information database;
    determining at least one entity from the description information of the reference image, the at least one entity identifying an object associated with the reference image; and
    generating description information of the target image based on the at least one entity, wherein the at least one entity comprises a plurality of entities, and the generating the description information of the target image comprises:
    determining feature parameters of the plurality of entities based on information related to an image source of the reference image, wherein the feature parameters comprise: a number of clicks on a content of the image source;
    determining at least one group of entities from the plurality of entities, entities in each of the at least one group of entities being identical;
    determining a statisticizing result of corresponding feature parameters of the at least one group of entities, wherein the determining the statisticizing result of corresponding feature parameters of the at least one group of entities comprises: determining a sum of numbers of clicks on entities in any one of the at least one group of entities; and
    generating the description information of the target image based on the statisticizing result.

2. The method according to claim 1, wherein the method further comprises:
    acquiring supplementary image information, the supplementary image information including description information of at least one of: a network image, a user-inputted image, or an image in an external storage device; and
    updating the reference image information database based on the supplementary image information.

3. The method according to claim 1, wherein the determining the at least one entity comprises:
    acquiring the at least one entity from the description information of the reference image using a named entity recognition technology.

4. The method according to claim 1, wherein the generating the description information of the target image based on the statisticizing result comprises:
    determining a correctness degree of the at least one group of entities identifying an object in the target image based on the statisticizing result;
    selecting a group of target entities from the at least one group of entities, the correctness degree corresponding to the group of target entities being higher than a threshold; and
    generating the description information of the target image based on the group of target entities.

5. The method according to claim 1, wherein the at least one entity comprises a plurality of entities, and the generating the description information of the target image comprises:
- determining feature parameters of the plurality of entities based on the reference image information database;
- determining a correctness degree of each of the plurality of entities identifying an object in the target image based on the feature parameters;
- selecting a target entity from the plurality of entities, the correctness degree corresponding to the target entity being higher than a threshold; and
- generating the description information of the target image based on the target entity.

6. The method according to claim 1, wherein the feature parameters further comprise at least one of:
- a number of times of displaying a content of the image source comprising the at least one entity;
- a number of views for the content of the image source;
- a number of occurrences of the at least one entity in the content of the image source;
- a weight corresponding to a position of the at least one entity in the content of the image source;
- a matching degree between the at least one entity and the target image; or
- a matching degree between the content of the image source comprising the at least one entity and the target image.

7. The method according to claim 1, wherein the description information of the reference image comprises at least one of: text information or structured information of the reference image.

8. The method according to claim 1, wherein the feature parameters comprise: a weight corresponding to a position of the at least one entity in the content of the image source, and determining the statisticizing result of corresponding feature parameters of the at least one group of entities comprises: determining an average of weights corresponding to positions of entities in any one of the at least one group of entities in the content of the image source including the group of entities.

9. An electronic device, comprising:
- one or more processors; and
- a storage apparatus for storing one or more programs, the one or more programs, when executed by the one or more processors, causing the one or more processors to perform operations comprising:
- acquiring description information of a reference image matching a target image from a reference image information database;
- determining at least one entity from the description information of the reference image, the at least one entity identifying an object associated with the reference image; and
- generating description information of the target image based on the at least one entity, wherein the at least one entity comprises a plurality of entities, and the generating the description information of the target image comprises:
- determining feature parameters of the plurality of entities based on information related to an image source of the reference image, wherein the feature parameters comprise: a number of clicks on a content of the image source;
- determining at least one group of entities from the plurality of entities, entities in each of the at least one group of entities being identical;
- determining a statisticizing result of corresponding feature parameters of the at least one group of entities, wherein the determining the statisticizing result of corresponding feature parameters of the at least one group of entities comprises: determining a sum of numbers of clicks on entities in any one of the at least one group of entities; and
- generating the description information of the target image based on the statisticizing result.

10. The electronic device according to claim 9, wherein the operations further comprise:
- acquiring supplementary image information, the supplementary image information including description information of at least one of: a network image, a user-inputted image, or an image in an external storage device; and
- updating the reference image information database based on the supplementary image information.

11. The electronic device according to claim 9, wherein the determining the at least one entity comprises:
- acquiring the at least one entity from the description information of the reference image using a named entity recognition technology.

12. The electronic device according to claim 9, wherein the generating the description information of the target image based on the statisticizing result comprises:
- determining a correctness degree of the at least one group of entities identifying an object in the target image based on the statisticizing result;
- selecting a group of target entities from the at least one group of entities, the correctness degree corresponding to the group of target entities being higher than a threshold; and
- generating the description information of the target image based on the group of target entities.

13. The electronic device according to claim 9, wherein the at least one entity comprises a plurality of entities, and the generating the description information of the target image comprises:
- determining feature parameters of the plurality of entities based on the reference image information database;
- determining a correctness degree of each of the plurality of entities identifying an object in the target image based on the feature parameters;
- selecting a target entity from the plurality of entities, the correctness degree corresponding to the target entity being higher than a threshold; and
- generating the description information of the target image based on the target entity.

14. The electronic device according to claim 9, wherein the feature parameters further comprise at least one of:
- a number of times of displaying a content of the image source comprising the at least one entity;
- a number of views for the content of the image source;
- a number of occurrences of the at least one entity in the content of the image source;
- a weight corresponding to a position of the at least one entity in the content of the image source;
- a matching degree between the at least one entity and the target image; or
- a matching degree between the content of the image source comprising the at least one entity and the target image.

15. The electronic device according to claim 9, wherein the description information of the reference image comprises at least one of: text information or structured information of the reference image.

16. A non-transitory computer readable storage medium, storing a computer program thereon, the program, when executed by a processor, causing the processor to perform operations comprising:
- acquiring description information of a reference image matching a target image from a reference image information database;
- determining at least one entity from the description information of the reference image, the at least one entity identifying an object associated with the reference image; and
- generating description information of the target image based on the at least one entity, wherein the at least one entity comprises a plurality of entities, and the generating the description information of the target image comprises:
- determining feature parameters of the plurality of entities based on information related to an image source of the reference image, wherein the feature parameters comprise: a number of clicks on a content of the image source;
- determining at least one group of entities from the plurality of entities, entities in each of the at least one group of entities being identical;
- determining a statisticizing result of corresponding feature parameters of the at least one group of entities, wherein the determining the statisticizing result of corresponding feature parameters of the at least one group of entities comprises: determining a sum of numbers of clicks on entities in any one of the at least one group of entities; and
- generating the description information of the target image based on the statisticizing result.

* * * * *